Patented Feb. 14, 1950

2,497,408

UNITED STATES PATENT OFFICE 2,497,408

MANUFACTURE OF PROPYLENE GLYCOL ESTERS

William F. Gresham, Wilmington, Del., assignor to E. I. du Pont de Nemours & Company, Wilmington, Del., a corporation of Delaware No Drawing. Application November 13, 1947, Serial No. 785,810

8 Claims. (Cl. 260—497)

1

This invention relates to a process for the preparation of propylene glycol acetates and more particularly to the preparation of such esters by the oxidation of propylene in the presence of acetic acid.

It is an object of the present invention to provide a process for the simultaneous oxidation and reaction of propylene with acetic acid. Another object is to provide a process for the controlled oxidation in the liquid phase of propylene in acetic acid by molecular oxygen in the presence of a highly active catalyst for the reaction. A further object is to provide an improved process for the preparation of propylene glycol monoacetate and propylene glycol diacetate in superior yields. Other objects and advantages of the invention will be apparent by reference to the following specification.

In accord with the invention it has been found that a mixture of propylene, acetic acid and a mixed catalyst can be oxidized with the production of propylene glycol monoacetate and propylene glycol diacetate, the reaction being accomplished by subjecting the mixture to oxidation by means of an oxygen-containing gas, for example, oxygen or air, or air enriched with oxygen. The reaction may be effected by bubbling the oxidizing gas into the mixture or bubbling via separate streams the propylene and oxidizing gas into a mixture of acetic acid and the catalyst. Various proportions of the propylene and acetic acid may be employed, based upon their weight percent, but a ratio of about three mols of propylene per mol of acetic acid is preferred although the ratio may range from 0.2 to 4 mols of acetic acid per mol of propylene.

The formation of propylene glycol diacetate by pressure air oxidation of propylene in acetic acid is believed to occur in accord with this equation:

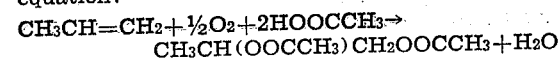
$$CH_3CH=CH_2 + \tfrac{1}{2}O_2 + 2HOOCCH_3 \rightarrow$$
$$CH_3CH(OOCCH_3)CH_2OOCCH_3 + H_2O$$

While the process may be carried out at various temperatures ranging from 100° C. upward to about 350° C., generally speaking the use of temperatures in the more restricted range of between 140° C. to 170° C. tends to give, other conditions remaining the same, higher proportions of the useful products. It has also been found that pressures aid in furthering the reaction and should be used to the extent of from 400 to 1500 pounds per square inch with a preferred range between 800 and 900 pounds per square inch.

2

The yields of the diester are markedly increased if a suitable catalyst is employed. For this purpose a mixed catalyst of a metal acetate such as lead acetate or ferric acetate and an alkaline earth metal acetate have been found very active and especially a lead acetate-calcium acetate catalyst used to the extent of from 0.02 to 0.5 percent of lead acetate and from 0.01 to 0.1 percent of calcium acetate or barium acetate based on the weight of acetic acid. Other very active catalysts include ferric acetate, zinc acetate, and bismuth subacetate, employed alone or in combination with the aforesaid alkaline earth acetates.

The metal may be added as an acetate, carbonate, hydroxide or other suitable salt that will give the acetate during the pressure oxidation. Surprisingly enough, I have found that whereas the abovementioned catalysts are highly active for the oxidation of propylene to propylene glycol mono and diacetate, other substances which commonly are believed to be good oxidation catalysts such as silver acetate, copper acetate, cobalt acetate and manganese acetate are not effective and in fact, will suppress oxidation.

As a further feature of the invention I have found that the yields and efficiency of the process may be even further improved by carrying on the oxidation in the presence of one or more "initiators," which term I employ herein to designate substances capable of initiating attack on the hydrocarbon molecule which may itself not readily react with molecular oxygen under my preferred low temperature conditions. For example, there may be employed organic peroxides such as sodium and hydrogen peroxide; peracids, such as peracetic and perbenzoic acids; the aldehydes, such as acetaldehyde, propionaldehyde, and isobutyraldehyde; ketones, such as acetone, methyl ethyl ketone, diethyl ketone, and cyclohexanone; ethers, such as diisopropyl, diethyl and diamyl ethers; olefines such as cyclohexene and octylene.

The ratio of air or other oxidizing gas to propylene employed may vary over a wide range although advantageously from 20 to 40 volume percent air is employed with a preferred range between 25 and 35 volume percent.

The examples illustrate preferred embodiments of the invention in which parts are by weight unless otherwise indicated.

*Example 1.*—A mixture composed of 70 volume percent propylene (404 g.) and 30 volume percent air was processed in a tantalum-lined bubble tower converter at a space velocity of 283 (calculated as total gas volume of S. T. P. per volume of acetic acid) through 500 g. of acetic acid which contained 0.1 percent lead acetate and 0.05 percent calcium carbonate catalysts and 0.1 percent each of propionaldehyde and methyl ethyl ketone initiators. The reaction was conducted at a temperature between 150° and 160° C. and under a pressure of 830 to 900 lbs. per sq. in. gauge pressure. The product mixture was subjected to distillation under reduced pressure so that acetic acid, water, and a small amount of aldehyde foreshot were separated, mixed propylene glycol acetates (83.7 g.) being distilled at 62°/4-5 mm. A high yield of propylene glycol acetate (calculated as the diacetate) was obtained with a conversion of 5.5 percent.

*Example 2.*—The process of Example 1 was repeated with a catalyst containing 0.1 percent lead acetate and 0.05 percent barium carbonate. The reaction was conducted between a temperature of 160° and 170° C., and at a pressure between 850 and 900 pounds per square inch gauge. Distillation of the reaction mixture produced 89 gr. of propylene glycol acetates which constitutes a conversion of 5.8 percent based on the propylene.

*Example 3.*—The process of Example 1 was repeated employing a catalyst containing 0.1 percent ferric acetate and 0.1 percent of propionaldehyde, and 0.1 percent methyl ethyl ketone. The reaction was conducted at a temperature between 148° and 150° C., under a pressure of 850 and 900 pounds per square inch gauge. The conversion of propylene to propylene glycol diacetate was 5.1 percent.

*Example 4.*—The process of Example 1 was repeated employing as the catalyst 0.1 percent lead acetate and 0.05 percent manganese acetate, and conducted at a temperature between 152° and 160° C., under a pressure between 825 and 870 pounds per square inch gauge. There was essentially under these conditions no oxidization, 99 percent of the acetic acid being unreacted. On distillation of the product no higher boiling material was found.

Although specific disclosures have been made of methods for carrying out the invention in accord with the batch process, nevertheless, it should be understood that the invention may also be practiced in accord with a continuous process. Thus, after completion of the reaction which may be accomplished by passing the propylene, acetic acid, oxygen and catalyst through a catalyst zone of considerable length relative to diameter, the unreacted propylene and oxygen are separated and the propylene glycol acetates recovered in a purified form by fractional distillation. The unreacted propylene-oxygen mixture, as an unexplosive mixture, diluted or not with an inert gas such as nitrogen, is, for economical operation, recycled after the introduction of make-up propylene and oxygen. By operating in accord with such a continuous process propylene recovery problems are avoided.

While the process described in the examples involves passage of the oxidizing gas through a body of liquid, it will be understood that other means of assuring the desired liquid-gas contact may be employed as, for example, passage of liquid and gas concurrently through a tube or tower, which may be supplied with plates, packing or other devices for enhancing gas-liquid contact.

I claim:

1. A process for the preparation of propylene glycol monoacetate and propylene glycol diacetate which comprises acting on acetic acid and propylene with an oxidizing gas at a temperature between 100° and 350° C., and under a pressure of at least 400 pounds per square inch in the presence of a mixed catalyst of an acetate of an alkaline earth and of an acetate of a heavy metal of the group consisting of lead and ferric iron.

2. The process of claim 1 conducted in the presence of a mixed catalyst of calcium acetate and a metal acetate of the group consisting of lead acetate and ferric acetate.

3. The process of claim 1 conducted in the presence of a mixed catalyst of barium acetate and a metal acetate of the group consisting of lead acetate and ferric acetate.

4. The process of claim 1 conducted at a temperature between 150° and 200° C. and in the presence of from 0.2 to 0.5 percent of lead acetate and from 0.01 to 0.1 percent calcium acetate based on the weight of acetic acid.

5. The process of claim 1 conducted at a temperature between 150° and 200° C. and in the presence of from 0.2 to 0.5 percent of lead acetate and from 0.01 to 0.1 percent barium acetate based on the weight of acetic acid.

6. A process for the preparation of propylene glycol monoacetate and propylene glycol diacetate which comprises acting with molecular oxygen on a mixture of propylene in acetic acid containing a mixed lead acetate-alkaline earth metal acetate catalyst at a temperature between 100° and 350° C. and under a pressure of at least 400 pounds per square inch.

7. The process of claim 6 in which there is present 0.1 percent lead acetate and 0.05 percent calcium acetate based on the weight of acetic acid.

8. The process of claim 6 in which there is present 0.1 percent lead acetate and 0.05 percent barium acetate based on the weight of acetic acid.

WILLIAM F. GRESHAM.

REFERENCES CITED

The following references are of record in the file of this patent:

UNITED STATES PATENTS

| Number | Name | Date |
|---|---|---|
| 2,138,917 | Green | Dec. 6, 1938 |